No. 781,744. PATENTED FEB. 7, 1905.
E. SCHAEFER.
FIRE EXTINGUISHER.
APPLICATION FILED AUG. 1, 1904.
2 SHEETS—SHEET 2.
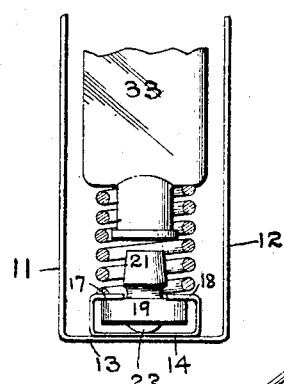
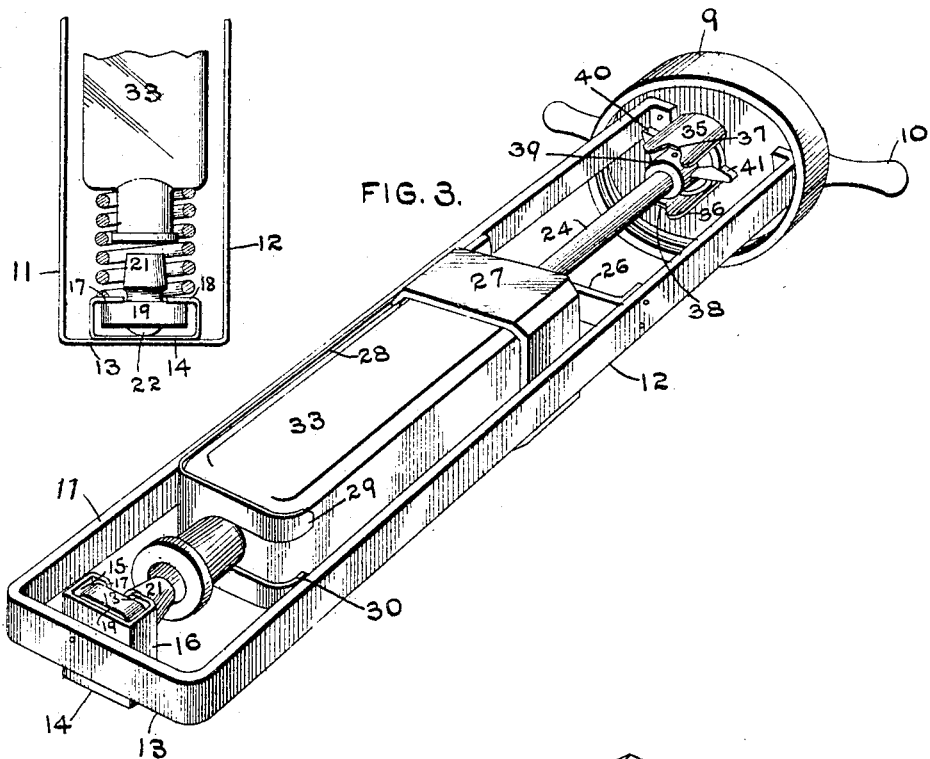
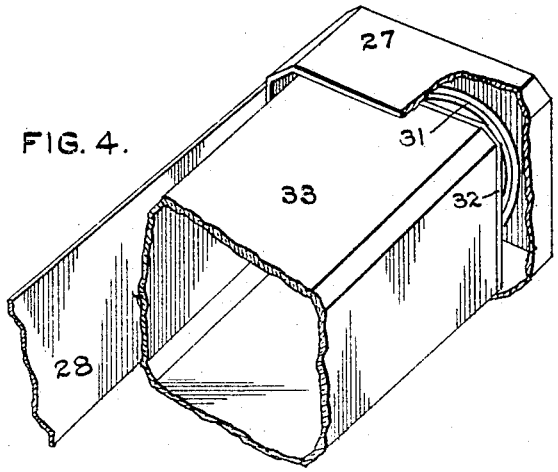
ATTEST
A. J. McCauley
Alfred Eick
INVENTOR:—
Edward Schaefer
BY Higdon, Longan & Hopkins
ATTY'S.

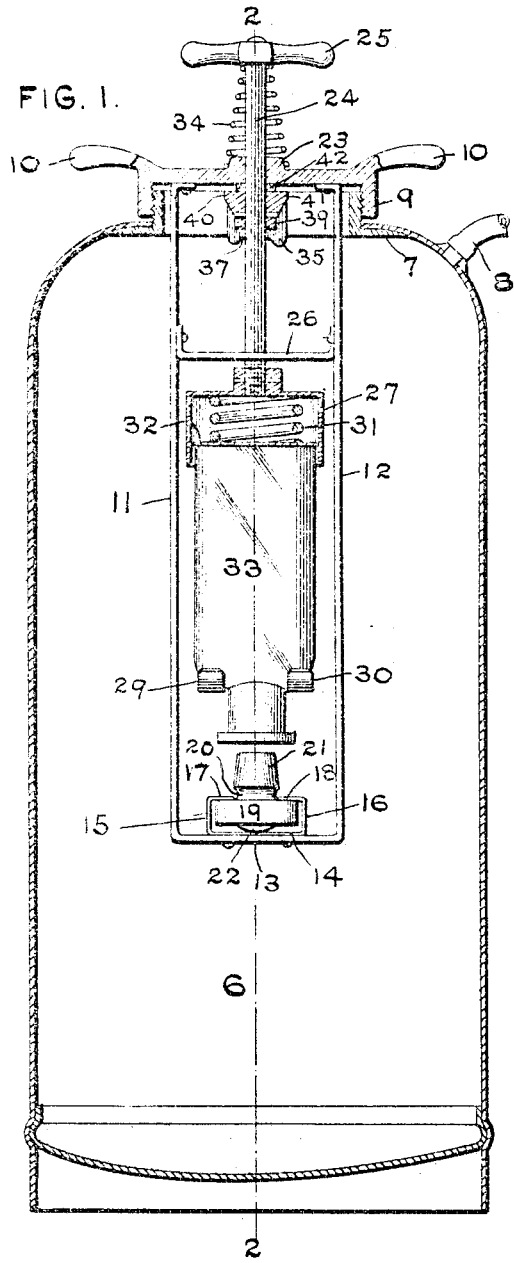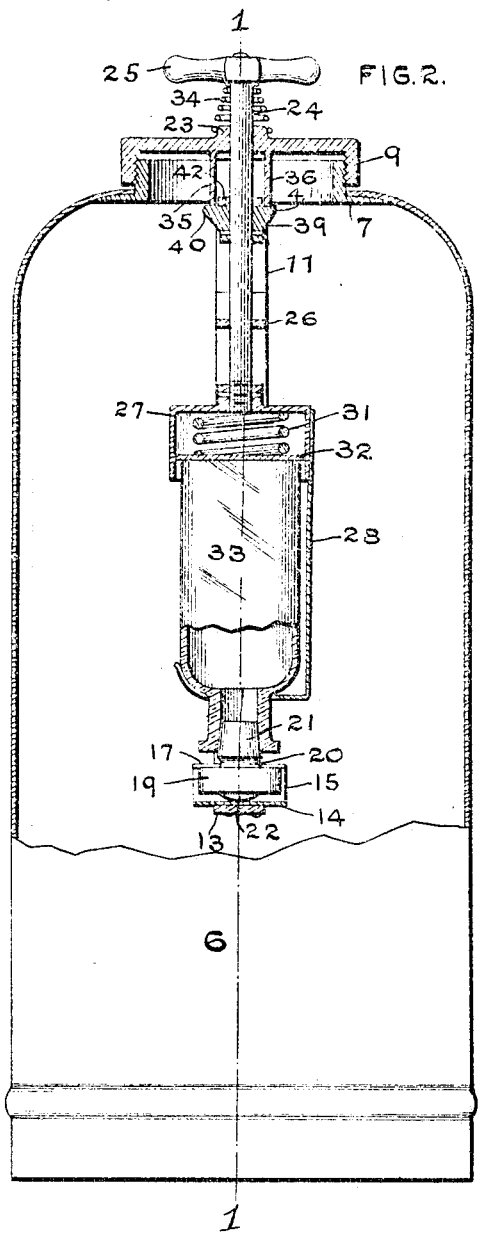

No. 781,744. Patented February 7, 1905.

UNITED STATES PATENT OFFICE.

EDWARD SCHAEFER, OF ST. LOUIS, MISSOURI.

FIRE-EXTINGUISHER.

SPECIFICATION forming part of Letters Patent No. 781,744, dated February 7, 1905.

Application filed August 1, 1904. Serial No. 219,069.

*To all whom it may concern:*

Be it known that I, EDWARD SCHAEFER, a citizen of the United States, and a resident of St. Louis, Missouri, have invented certain new and useful Improvements in Fire-Extinguishers, of which the following is a specification containing a full, clear, and exact description, reference being had to the accompanying drawings, forming a part hereof.

My invention relates to fire-extinguishers; and it consists of the novel features herein shown, described, and claimed.

In the drawings, Figure 1 is a vertical central section of the fire-extinguisher embodying the principles of my invention and taken on the line 1 1 of Fig. 2 and showing the acid-bottle elevated from the stopper. Fig. 2 is a vertical central section on the line 2 2 of Fig. 1 and showing the acid-bottle in position to be closed by the stopper. Fig. 3 is an enlarged detail perspective of the acid-bottle and cage removed from the reservoir. Fig. 4 is an enlarged detail perspective showing the mounting of the acid-bottle, parts being broken away to illustrate the construction and parts being broken away to economize space. Fig. 5 is a view analogous of Fig. 1, showing a modified form of connection for separating the acid-bottle from the stopper, the other parts being omitted.

Referring to the drawings in detail, the reservoir 6 is of an ordinary construction and has a screw-threaded nipple 7 forming an opening at its upper end and has a discharge-pipe 8 leading from the upper end. The cap 9 is internally screw-threaded and mounted upon the nipple 7, there being handles 10 for operating the cap.

The acid-bottle frame comprises the arms 11 and 12, screwed to the lower face of the cap 9 and extending downwardly through the nipple 7 to a point below the center of the reservoir 6, and the brace 13, connecting the lower ends of the arms 11 and 12.

The stopper-cage comprises the central portion 14, screwed to the upper face of the brace 13, the arms 15 and 16, extending upwardly from the central portion 14, and the fingers 17 and 18, extending inwardly from the upper ends of said arms. The arms 15 and 16 are parallel with the arms 11 and 12, so that the stopper may be inserted or removed upon a line at right angles to the said arms 11 and 12.

The stopper comprises a large square head 19, having rounded corners and fitting between the arms 15 and 16; the neck 20, extending upwardly from the head 19; the plug 21, extending upwardly from the neck, and the hemispherical bearing 22, extending downwardly from the head 19 in vertical alinement with the plug, said bearing 22 pressing against and sliding upon the central portion 14 to tighten the head 19 within the stopper-cage. The plug 21 is in the form of a ground glass stopper, said plug being properly beveled and ground, and the bearing 22 is in alinement with the plug, so that the pressure upon the plug will be exerted upon the bearing and not upon the portions of the head 19 which are outside of the bearing, thereby reducing the liability of breaking the head. The edges of the fingers 17 and 18 may fit closely around the neck 20, so that when the stopper is inserted it will fit tightly into its cage and be held from falling out.

The lug 23 extends upwardly from the center of the cap 9 to form a spring-seat. The operating-shaft 24 is slidingly and rotatably mounted through the center of the cap 9 at the center of the lug 23, there being a handle 25 upon the upper end of the shaft for operating the shaft. The bearing-block 26 is inserted between the arms 11 and 12 near the upper ends, and the shaft 24 extends through this bearing-block.

The acid-bottle cage comprises a housing 27, attached to the lower end of the shaft 24; an arm 28, extending downwardly from one side of the housing, and spring retaining-fingers 29 and 30, extending laterally from the lower end of the arm 28, one upon each side of the bottle-neck, and upwardly around the shoulder of the bottle; the expansive coil-spring in the housing 27, and the follower-plate 32 in the housing against the spring 31. The acid-bottle 33 is turned bottom upward and pressed against the follower-plate 32, thereby compressing the spring 31 until the fingers 29 and 30 will snap into position and hold the bottle against the pressure of the spring.

The conical coil-spring 34 is inserted around the spring-seat 23 around the upper end of the shaft 24, said spring pressing upwardly against the handle 25 and the tension of said spring being exerted to hold the bottle 33 elevated from the stopper, as shown in Fig. 1. The stop-arms 35 and 36 extend downwardly from the cap 9, one upon each side of the shaft 24, there being retaining-notches 37 and 38 in the lower edges of said arms.

The collar 39 is mounted upon the shaft 24 in position to operate between the arms 35 and 36, and teeth 40 and 41 extend in opposite directions from said collar, said teeth being in position to engage in the retaining-notches 37 and 38 when the spring 34 is compressed and the shaft 24 is rotated one-quarter of a turn and said teeth being in position to pass upwardly between the arms 35 and 36 when the shaft is again rotated one-quarter of a turn in either direction.

The rubber gasket 42 is mounted upon the shaft 24 above the collar 39, so that when the fire-extinguisher is in operation by releasing the acid the tension of the spring 34 will press the gasket against the inner and lower face of the cap 9 and form a tight joint around the shaft 24.

The mouth of the acid-bottle is ground to fit the stopper, and when it is desired to fill the acid-bottle the cap 9 is removed from the reservoir, the acid-bottle turned to a vertical position right end up, the acid placed in the bottle, and then the arms 12 are grasped with one hand and the handle 25 is grasped with the other hand and the spring 34 is compressed to elevate the bottle so that the stopper will enter the mouth of the bottle. Then the shaft 24 is rotated relative to the cap 9 or arms 11 and 12 until the teeth 40 and 41 are in position to enter the notches 37 and 38. Then the handle 25 is released and the tension of the spring 34 holds the teeth in the notches 37 and 38 and the pressure of the spring 31 holds the bottle firmly against the stopper. During this operation it is important that the stopper be held from rotation while the bottle is being rotated, for the reason that the ground-glass stopper will form a better seat in the mouth of the bottle when one is rotated relative to the other. If desired, paraffin or other suitable material may be applied to the stopper before it is inserted into the bottle. The square head of the stopper fitting in the square stopper-cage holds the stopper from rotating while the bottle is being operated. The spring 31 not only forms a yielding connection between the stopper and the bottle, but it also serves to press the bottle firmly against the stopper. By extending the arms 11 and 12 downwardly into the reservoir and mounting the acid-bottle in an inverted position I discharge the acid into the center of the volume of water, which secures a better mixture of acid and water than could otherwise be secured. In fire-extinguishers where the bottle discharges at a point near the top of the water the acid is expelled before the water is expelled, thereby greatly weakening the operation and reducing the efficiency of the extinguisher. The expansive force of the spring 34 serves to pull the bottle away from the stopper, thereby discharging the acid.

In the modification shown in Fig. 5 an expansive spring 43 is placed around the stopper and around the neck of the bottle to force the bottle away from the stopper. In this construction the arm 28 and the spring-fingers 29 and 30 may be omitted. It is thought to be immaterial where the separating-spring is located, the only requirement being that it shall have sufficient force to separate the bottle from the stopper.

The elasticity of the spring 31 provides a means of compensation for irregularities and differences in the length of bottles used.

Heretofore where acid-bottles have been mounted bottom upward in fire-extinguishers it has been found practically impossible to prevent leakage of the acid, and I have found by actual experience that my ground-glass stopper inserted by a rotary reciprocating motion will prevent leakage better than any other known construction.

I claim—

1. In a fire-extinguisher: a cap; arms extending downwardly from the cap; a brace connecting the lower ends of the arms; a stopper-cage mounted upon the upper face of the brace; a stopper removably mounted in the cage; a bearing-block between the arms near the upper ends; an operating-shaft slidingly mounted through the cap and through the bearing-block; a bottle-cage attached to the lower end of the shaft; a spring in the bottle-cage; a bottle in the bottle-cage against the spring; means for holding the bottle slidingly in position to engage the stopper; and a spring outside of the cap for operating the shaft to move the bottle away from the stopper.

2. In a fire-extinguisher: a cap; an operating-shaft extending through the cap; a spring outside of the cap and attached to the operating-shaft; the tension of the spring being exerted to slide the shaft outwardly; stop-arms extending downwardly from the cap one upon each side of the shaft; there being retaining-notches in the lower edges of the arms; a collar upon the shaft between the stop-arms; and teeth extending from the collar in position to engage in the retaining-notches.

3. In a fire-extinguisher: a cap; arms extending downwardly from the cap; a brace connecting the lower ends of the arms; a stopper-cage mounted upon the brace; and comprising the center portion 14, the arms 15 and 16 extending upwardly from the center portion, and fingers 17 and 18 extending inwardly from the upper ends of the arms; a stopper having a large square head fitting between the arms 15 and 16; and an acid-bottle yieldingly mounted to engage the stopper.

4. In a fire-extinguisher: a cap; arms extending downwardly from the cap; and a stopper mounted between the lower ends of the arms; an operating-shaft mounted through the cap; an acid-bottle cage mounted upon the inner end of the operating-shaft and comprising a housing 27, the arm 28 extending downwardly from one side of the housing, and spring retaining-fingers extending laterally from the lower end of the arm, one for each side of the bottle-neck; a spring in the acid-bottle cage; and a bottle mounted between the fingers in opposition of the spring.

5. In a fire-extinguisher: a cap; arms extending downwardly from the cap; and a stopper mounted between the lower ends of the arms; an operating-shaft mounted through the cap; an acid-bottle cage mounted upon the inner end of the operating-shaft and comprising a housing 27, the arm 28 extending downwardly from one side of the housing, and spring retaining-fingers extending laterally from the lower end of the arm, one for each side of the bottle-neck; a spring in the acid-bottle cage; and a bottle mounted between the fingers in opposition of the spring.

In testimony whereof I have signed my name to this specification in presence of two subiscribng witnesses.

EDWARD SCHAEFER.

Witnesses:
 GEORGE BERGMANN,
 EDWARD E. LONGAN.